United States Patent

[11] 3,587,841

| | | | | | | |
|---|---|---|---|---|---|---|
| [72] | Inventor | Kevork Devejian<br>36-25 Prince St., Flushing, N.Y. 11354 | 3,135,450 | 6/1964 | Chaplin | 229/2.5 |
| [21] | Appl. No. | 855,182 | 3,272,325 | 9/1966 | Schoenmakers | 206/52F |
| [22] | Filed | Sept. 4, 1969 | 3,386,567 | 6/1968 | Smith | 206/46H |
| [45] | Patented | June 28, 1971 | 3,509,993 | 5/1970 | Michel | 206/65R |
| | | Continuation-in-part Ser. No. 839,153, July 7, 1969. | | | | |

*Primary Examiner*—William T. Dixson, Jr.
*Attorney*—Charles J. Speciale

[54] CASSETTE PACKAGING
6 Claims, 3 Drawing Figs.

[52] U.S. Cl.................... 206/52, 206/72, 229/2.5
[51] Int. Cl..................... B65d 5/04, B65d 85/67
[50] Field of Search.... 206/52 (R), 52 (F), 45.14, 45.19, 65, 72, 46 (HWDE), 62 (P.R.); 229/2.5, 14 (C), 10; 220/31 (S.R.); D87/1 (1.4)

[56] References Cited
UNITED STATES PATENTS
2,713,940  7/1955  Putman .................. 206/65

ABSTRACT: Packaging for a cassette cartridge comprising a cassette cartridge holding means and covering means therefor, the holding means comprising a tray adapted to receive the cassette, the cassette having an enlarged portion, the tray being provided with improved graduated means for compensating for the enlarged portion of the cassette so that the cassette is held in the tray at a position substantially level with the upper edges of the tray walls, which graduated means, at the same time, provide the cassette with additional support means in that the cartridge does not rest on the floor of the tray itself but, is rather elevated therefrom and impact damage to it is therefore minimized, the covering means comprising an open ended sleeve adapted to tightly fit over and cover the cassette and the tray.

PATENTED JUN 28 1971 3,587,841
INVENTOR
KEVORK DEVEJIAN
BY Charles J. Speciale
ATTORNEY
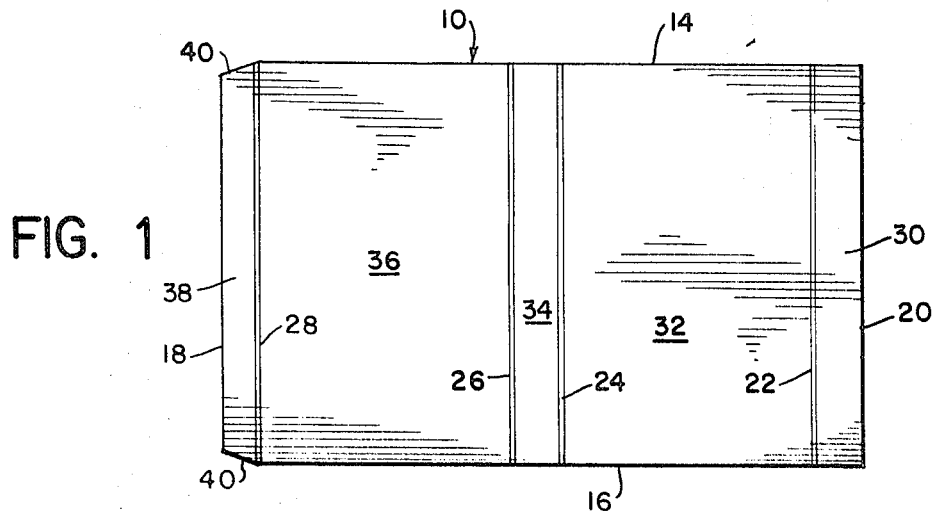
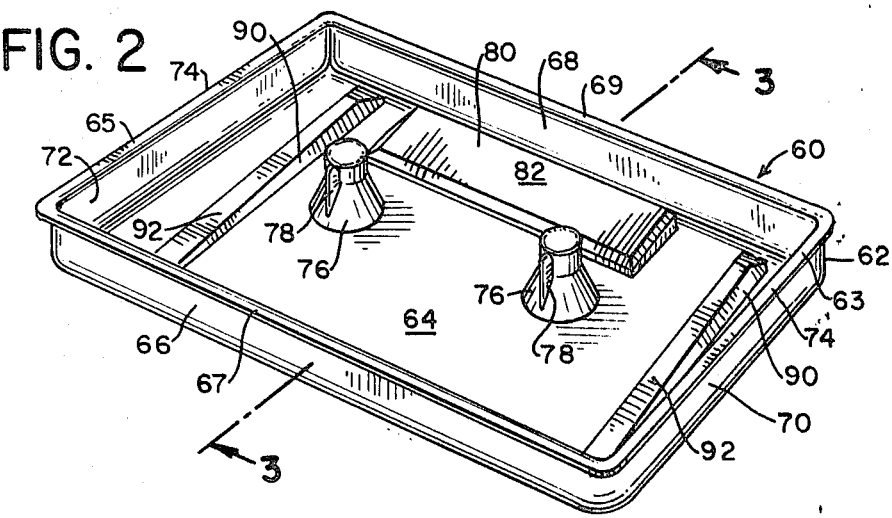
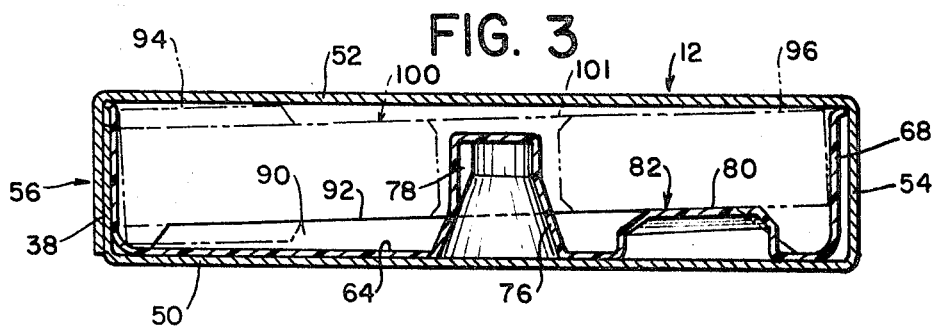

3,587,841

CASSETTE PACKAGING

BACKGROUND OF RELATED APPLICATIONS

The present application is a continuation-in-part of my copending U.S. application Ser. No. 839,153, filed July 7, 1969 and entitled "Cassette Packaging."

BACKGROUND OF THE INVENTION

1. Field of the Invention

This invention relates generally to packaging and more particularly the invention relates to improved cassette packaging.

2. Description of the Prior Art

In my copending application, there is disclosed and claimed an improved packaging for a cassette cartridge including tape reels comprising in combination cartridge holding means and covering means therefor, the holding means further comprising a tray adapted to receive the cartridge and adapted to releasably lockingly receive the tape reels in a fixed position and to hold the cartridge at a position level with the sidewalls of the tray, the covering means further comprising a sleeve adapted to fit over the tray to cover the tray and cartridge contained therein. Informative decorative material may be provided on a face of the covering sleeve.

While in that application a platform is provided on the floor of the tray to compensate for the enlarged portion found along one longitudinal edge of the usual cassette, it has been found according to the present invention that an improved leveling effect can be achieved providing at the same time means for holding the cassette within the tray in a supported raised position.

SUMMARY OF THE INVENTION

It is therefore among one of the principal objectives of the invention to provide improved cassette packaging wherein the package is adapted to hold the cassette in a secure compact condition.

In accordance with the present invention, there is provided improved packaging for a cassette cartridge, the cassette cartridge including a thickened longitudinal portion, the packaging comprising in combination cassette cartridge holding means and covering means therefor, said holding means comprising a tray adapted to receive said cartridge, said tray being provided with graduated means for compensating for the thickened portion of the cassette and to hold it at a position level with the upper edges of the walls of the tray, as well as in a supported impact resistable position, the covering means comprising a sleeve adapted to removably tightly fit over the tray to cover the tray and cartridge contained therein. As described in my said copending application, informative decorative material may be provided on a face or faces of the covering sleeve and a transparent shrink wrap may be provided for maintaining the package in a clean and dustfree condition.

BRIEF DESCRIPTION OF THE DRAWINGS

The invention will be hereinafter more fully described with reference to the accompanying drawings in which:

FIG. 1 is a plan view of a blank utilized in the manufacture of the covering sleeve to be employed in the inventive combination.

FIG. 2 is a view in perspective of the improved tray for holding a cassette cartridge also constructed in accord with the invention.

FIG. 3 is a sectional view taken along line 3-3 of FIG. 2 and in a direction of the arrows, with a covering sleeve shown thereover, and with a cassette shown inside the tray in phantom.

DESCRIPTION OF THE SPECIFIC EMBODIMENTS

Referring now to the FIGS. in detail, there is shown a blank 10 foldable to define a sleeve 12 formed pursuant to the invention. Blank 10 is made of a suitable rigid sheet material such as light cardboard. Blank 10 is preferably rectangular in shape and as such, has a pair of parallel opposing longitudinal edges 14 and 16 and a pair of parallel opposing transverse edges 18 and 20.

Between the longitudinal edges 14 and 16 the blank is provided with four parallel transverse fold lines 22, 24, 26 and 28, which are spaced laterally between the transverse edges 18 and 20. Thus, the fold line 22 and transverse edge 20 define a side wall forming member 30; fold lines 22 and 24 define a bottom wall forming member 32; fold lines 24 and 26 define another side wall forming member 34; fold lines 26 and 28 define a top wall forming member 36; and fold line 28 and transverse edge 18 define still another side wall forming member 38. Additionally, both longitudinal ends of the side wall forming member 38 are inwardly tapered as at 40.

The blank thus formed is foldable to define the sleeve 12 having a bottom wall 50 corresponding to bottom wall forming member 32; an opposing top wall 52 corresponding to top wall forming member 36; a first sidewall 54 corresponding to top wall forming member 36; a first sidewall 54 corresponding to sidewall forming member 34; and a parallel opposing second sidewall 56, formed from sidewall forming members 30 and 38 resulting in a double wall with the member 38 becoming the innermost wall. Side wall forming members 30 and 38 are mutually secured by suitable means such as by gluing.

Thus, the sleeve when formed and suitably glued defines an elongated open tube.

The holding means 60 for accommodating the cassette cartridge in accord with the invention comprise an elongated (preferably rectangular) tray 62 having a floor 64, a pair of parallel opposing longitudinal sidewalls 66 and 68 and a pair of parallel opposing transverse end walls 70 and 72. Additionally and preferably, each of the end walls is provided with a supporting rib 74 contiguous with the upper end of each end wall and in smooth relation therewith as also disclosed in my said copending application. As also mentioned in that application, the tray is made of any suitable light plastic material, such as high impact styrene, by a conventional vacuum forming process well-known to the art. A pair of opposing upwardly projecting bosses 76 of truncated conical shape are provided on the floor 64 of the tray. Each boss is, in turn, further provided with an outwardly extending lip portion 78 extending in the direction of sidewall 66.

Between the bosses 76 and sidewall 68 and closer to the sidewall than to the bosses, there is provided an elongated platform 80 of a preferably rectangular shape. The upper surface 82 of platform 80 has a downward slope extending in the direction of the bosses 76. Additionally running in a transverse direction between sidewalls 66 and 68, there is provided between each of the end walls 70 and 72 and the bosses 76, a rib member 90 whose upper surface 92 has a downward slope corresponding to the slope of the platform upper surface 82. These sloped configurations provide a graduated leveling effect which compensate for the enlarged longitudinal portion 94 found on the usual cassette cartridge. In order to place the cassette 100 in the tray, what is done is to place the cassette with the reels, not shown, however as described in my said copending application, locked in position on bosses 76 with the narrower end 96 of the cassette resting on the platform 80 and rib members 90 and with the wider portion 94 of the cassette oppositely disposed therefrom within the tray.

Looking particularly to FIG. 3, it will be seen that the narrower portion 96 of the cassette 100 will rest on the sloping platform surface 82 and on sloping rib member surfaces 92. Thus the leveling effect is graduated according to the slope of the aforementioned surfaces and moreover, by virtue of the two additional supporting surfaces provided by the transverse ribs 90, additional impact resistance is imparted to the tray and to the cassette contained in the tray. Thus by the invention, not only is the cassette held level in the tray in a graduated fashion, so that the longitudinal edges of the cassette face 101 are substantially level with the upper edges 63, 65, 67, 69 of the tray walls, but moreover, by virtue of the two additional rib members added impact resistability is achieved for the cartridge, since the cassette is almost completely elevated from the floor of the tray. The slope of the surfaces 82 and 92 will be substantially the same, as earlier mentioned, and will generally be in the nature of about a 15 to 20 degree slope, however this will vary somewhat with the amount of graduated leveling effect desired, so that the slope can be slightly less than that or can be slightly more. The critical point is that the slope should always be of a magnitude sufficient to keep the face 101 of the cassette 100, as well as its enlarged portion 94, substantially level with the upper edges of the tray walls.

In another embodiment of the invention, the platform 80 can be omitted so that the graduated leveling effect is achieved only by the ribs 90, however, this is less preferred, since a certain amount of support for the cassette is resultingly lost.

In accord with the inventive combination with a cassette placed in the tray as just described, a folded sleeve 12 bearing the necessary descriptive information is slipped over the tray and cartridge contained therein. The tray and sleeve are associatingly shaped so that the sleeve will fit tightly over the tray and cartridge providing for a compact package where the cassette does not move about therein. This is another point where the slope of platform 80 and transverse ribs 90 can be important, and that is by fixing the slope so that the cassette face portions are as level with the tray wall edges as possible, the cassette can also be tightly held by the sleeve 12 thereby further minimizing moving about of the cassette within the tray. As mentioned earlier, the sleeve rather than being lockable, as in the earlier said copending application, is glued at its sidewall portions and can thus be easily slipped over the tray and cartridge without any danger of its being accidentally unlocked.

I claim:

1. Packaging for a cassette cartridge comprising in combination cassette cartridge holding means and covering means therefor, said holding means comprising a tray adapted to receive said cassette, said cassette having a thickened portion, said tray having a floor, a pair of parallel opposing sidewalls and a pair of parallel opposing end walls, said tray being provided with graduated means for compensating for the thickened portion of said cassette so that said cassette is held at a position substantially level with the upper edges of the tray walls, said graduated means simultaneously providing said cassette with support means so that said cassette substantially does not rest on the floor of said tray but is elevated therefrom thereby imparting impact resistability to said cassette, said covering means comprising an open ended sleeve adapted to tightly fit over and cover said tray and cassette contained therein.

2. The combination according to claim 1 wherein said graduated means are provided on the floor of said tray and comprise an elongated longitudinally oriented platform having a predetermined slope and a pair of elongated transversely oriented rib members having a like predetermined slope, said cassette being reposable upon said platform and rib members, said thickened portion of said cassette being situate at a position directly opposite said platform, said slope descending in the direction of said thickened portion whereby a graduated leveling effect is achieved for the cassette held within the tray.

3. The combination according to claim 1 wherein said graduated means are provided on the floor of said tray and comprise a pair of elongated transversely oriented rib members having a predetermined slope, said cassette being reposable upon said rib members so that said slope descends in the direction of said thickened portion on said cassette whereby a graduated leveling effect is achieved for the cassette held within the tray.

4. The combination according to claim 2 wherein said sleeve further comprises opposing top and bottom walls and a first and second opposing sidewall, said second sidewall comprising a double wall whose two walls are mutually secured by gluing means.

5. The combination according to claim 3 wherein said sleeve further comprises opposing top and bottom walls and a first and second opposing sidewall, said second sidewall comprising a double wall whose two walls are mutually secured by gluing means.

6. Packaging for a cassette cartridge comprising in combination cassette cartridge holding means and covering means therefor, said holding means comprising a tray adapted to receive said cassette, said cassette having a thickened portion, said tray having a floor, a pair of parallel opposing sidewalls and a pair of parallel opposing end walls, said tray being provided with graduated means for compensating for the thickened portion of said cassette so that said cassette is held at a position substantially level with the upper edges of the tray walls, said graduated means simultaneously providing said cassette with support means so that said cassette substantially does not rest on the floor of said tray but is elevated therefrom thereby imparting impact resistability to said cassette, said covering means comprising an open ended sleeve adapted to tightly fit over and cover said tray and cassette contained therein, and wherein said graduated means are provided on the floor of said tray and comprise an elongated longitudinally oriented platform having a predetermined slope and a pair of elongated transversely oriented rib members having a like predetermined slope, said cassette being reposable upon said platform and rib members, said thickened portion of said cassette being situate at a position directly opposite said platform, said slope descending in the direction of said thickened portion whereby a graduated leveling effect is achieved for the cassette held within the tray.